R. E. BRAKEY.
WAVE MOTOR.
APPLICATION FILED AUG. 31, 1909.
993,221.
Patented May 23, 1911.
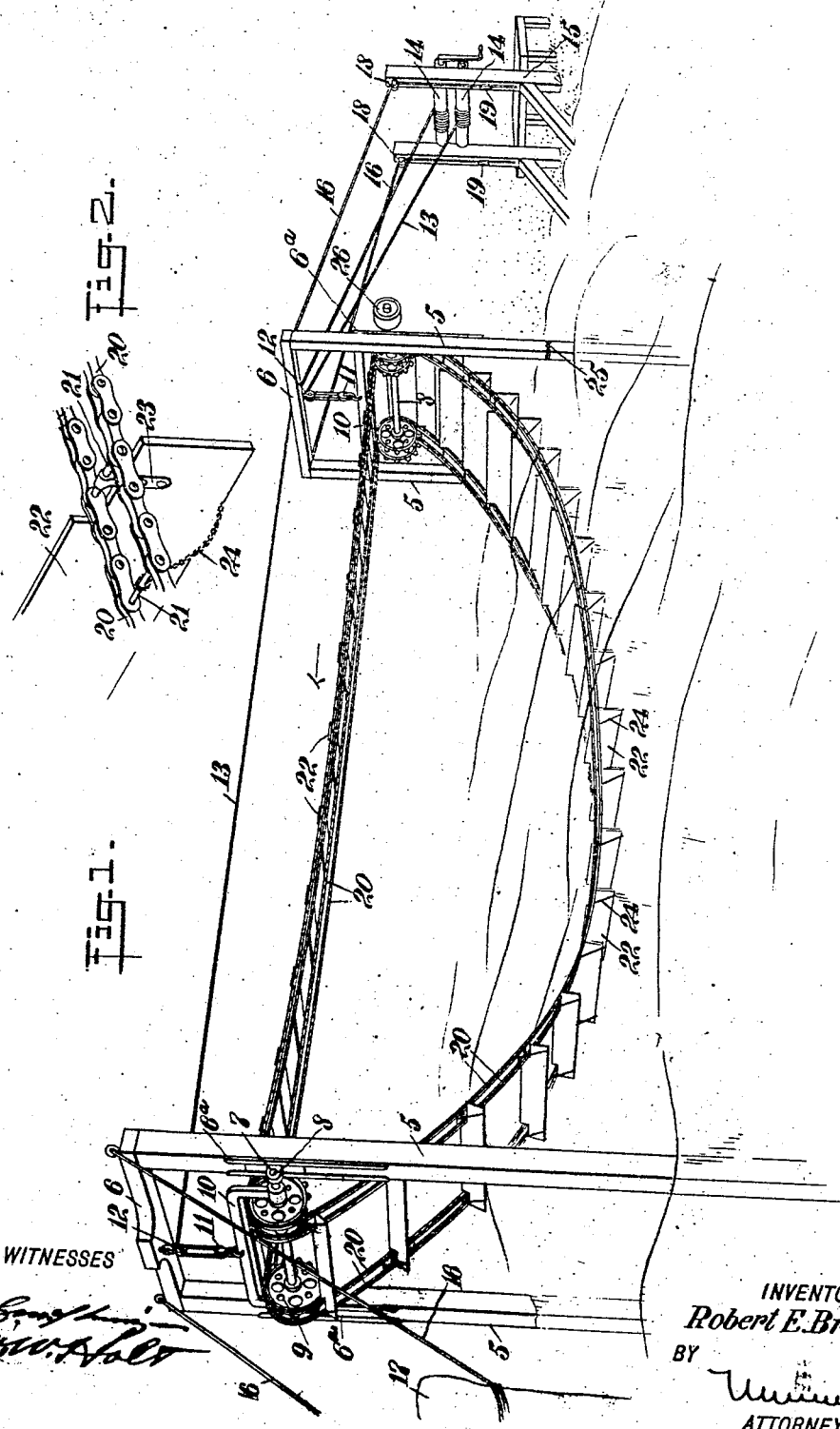
WITNESSES
INVENTOR
Robert E. Brakey
BY
ATTORNEYS

UNITED STATES PATENT OFFICE.

ROBERT E. BRAKEY, OF VENTURA, CALIFORNIA.

WAVE-MOTOR.

993,221.　　　　　　Specification of Letters Patent.　　Patented May 23, 1911.

Application filed August 31, 1909. Serial No. 515,381.

*To all whom it may concern:*

Be it known that I, ROBERT E. BRAKEY, a citizen of the United States, and a resident of Ventura, in the county of Ventura and State of California, have invented a new and Improved Wave-Motor, of which the following is a full, clear, and exact description.

The invention is an improvement in wave motors, and has in view such an appliance embodying an endless chain or cable supported on wheels spaced at such distances apart as to permit of the lower length of the chain or cable sagging from the wheels into the water, the chain having actuating blades hinged at intervals of its length to swing or fold back on the chain in one direction and held against pivotal movement in the opposite direction when occupying an intermediate or vertical position, whereby the faces of the blades presented to the incoming waves are unyielding, and the opposite faces thereof when acted on will cause the blades to fold against the chain and offer little resistance to the return movement of the water.

The invention further contemplates the independent vertical adjustment of the wheels to compensate for the rise and fall of the water level due to the tide, and the adjustment of the wheels to and from each other to increase or decrease the sag in the lower length of chain, in order that the chain may be adjusted to the slope of the shore line which is varied by the drifting of the sands.

Reference is to be had to the accompanying drawings forming a part of this specification, in which similar characters of reference indicate corresponding parts in both views.

Figure 1 is a perspective view of a wave motor constructed in accordance with my invention; and Fig. 2 is a perspective view illustrating the mode of applying the wave-actuated blades to the chain or cable.

In carrying out my invention I provide two supports arranged in a line outwardly from the beach in a suitable depth of water, each consisting of posts or piles 5, 5, arranged side by side, spaced apart and connected at their upper ends by a cross-bar 6. The posts of each frame or support are provided with vertical guides 6$^a$ on their outer faces, extending above the high water level, and in each set of guides is suitably retained a bearing 7, in which is journaled a shaft 8, the shaft having one or more fixed wheels 9, preferably in the form of sprocket wheels arranged in pairs adjacent to each end. At the outside of each pair of sprocket wheels a yoke frame 10 is journaled on the shaft, having a tackle block 11 arranged under a tackle block 12 carried by the cross-bar 6, the two blocks being operatively connected by a cable 13 passing to one of the windlasses 14 arranged on a suitable frame 15 located on the beach. The supporting frames are braced by guy-lines 16 extending outwardly, the guy-lines of the outer frame being secured to piles or other anchorings 17, and the guy-lines of the inner frame passing to and detachably secured to the frame 15, preferably by passing these lines over sheaves 18 arranged at the top of the posts on which the windlasses are journaled, with the ends of the lines extending to and wrapped about cleats 19.

Carried on the sprocket wheels 9 of the shafts 8, 8, is an endless belt having pairs of sprocket chains 20, 20 arranged at each side, with the chains of each pair connected at intervals by cross-pins 21, the cross-pins being extended to form the pivots between certain of the links. The two pairs of chains are connected together at intervals of the belt by actuating blades 22, each blade being in the nature of a flat plate or board cut out at the opposite ends to receive the pairs of chains, the connection of the board with each pair of chains being effected by securing to the rabbeted or cut-out edge of the blade, brackets 23 journaled on certain of the pins 21. That side of each blade presented to the incoming wave is prevented from swinging rearwardly by chains or other flexible connections 24 extending between the lower edge of the blade and the pins 21 arranged at the front thereof, the blades being foldable on the endless chain or belt when swung in the opposite direction. The endless belt is of sufficient length to admit of the lower length thereof sagging from the sprocket wheels of each supporting frame into the water, as clearly shown in Fig. 1. In order that this sagging of the chain may be varied to accommodate the motor to the variation of the bottom caused by the shifting of the sands, the inner posts 5, 5, of the inner supporting frame are each hinged at or near the water level as indicated at 25, adapting this frame to swing to and from the opposite and outer frame, whereby the shafts 8, 8 are carried to and from each other. One of these shafts, preferably that of the innermost frame, is provided with a pulley 26 for transmitting the power.

With the motor adjusted as shown in Fig. 1, the incoming waves strike the unyielding faces of the blades, which causes the chain to travel in the direction indicated by the arrow. On the reaction of the waves or return movement of the water the blades fold back on the endless belt and offer no substantial resistance. As the blades pass to the upper length of the belt they drop down in folded position, in which position they remain until the outer sprocket wheels are reached, when they again swing out at right-angles to the belt under the action of gravity.

Having thus described my invention, I claim as new and desire to secure by Letters Patent:

1. In a wave motor, supports spaced apart, each having a revoluble wheel, an endless belt carried on said wheels, with the lower length thereof adapted to sag from the wheels into the water, actuating blades arranged on the belt at intervals of its length, and means to vertically adjust the wheels independently of each other.

2. In a wave motor, supports spaced apart, each having posts arranged side by side in spaced relation, each post having a vertical guide, a bearing slidable in each guide, a shaft journaled in the bearings of each support, wheels carried by the shafts, an endless belt passing over the wheels having actuating blades, a frame arranged inwardly from the supporting frames and having windlasses independently operated, yoke frames operatively connected to the shafts, and cables passing to the windlasses and operatively connected to the frames to raise and lower the shafts.

3. In a wave motor, supports spaced apart, each support having a shaft journaled thereon provided with a wheel, with the upper portion of one of said supports hinged to swing to and from the other support, an endless belt passing over the wheels of the supports having actuating blades, means to independently adjust the shafts on the supports in a vertical direction, and means to adjust the angular position of the hinged support.

4. In a wave motor, supports spaced apart, a shaft journaled on each support having sprocket wheels secured thereto and arranged in pairs, and an endless belt having chains arranged to engage the sprocket wheels and provided with actuating blades, with each blade cut out at the edge adjacent to the ends to receive the pairs of chains.

5. In a wave motor, supports spaced apart, an approximately horizontal shaft journaled on each support, having sprocket wheels secured thereto, arranged in pairs, endless chains passing over the sprocket wheels of the shafts, cross-pins connecting the chains of each pair at intervals of their length, blades hinged on certain of the cross-pins to extend between the chains and fold thereon when moved in one direction, and means to prevent the blades from folding on the chains when moved in the opposite direction.

In testimony whereof I have signed my name to this specification in the presence of two subscribing witnesses.

ROBERT E. BRAKEY.

Witnesses:
O. H. HEDGES,
R. L. HERRICK.